Sept. 22, 1964   C. W. GALLOWAY   3,149,848
HYDRAULIC CAP AND PRESSURE RING SEAL
Filed Nov. 14, 1960
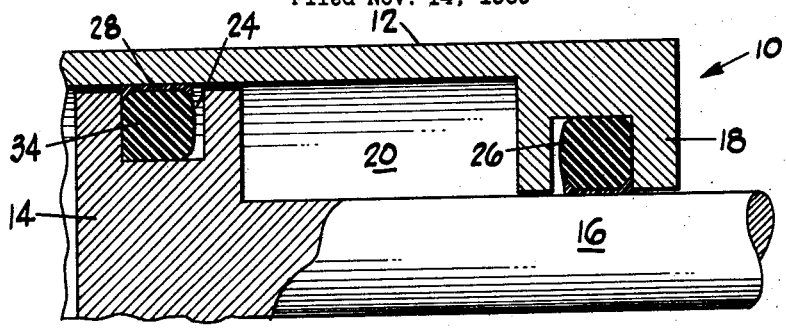
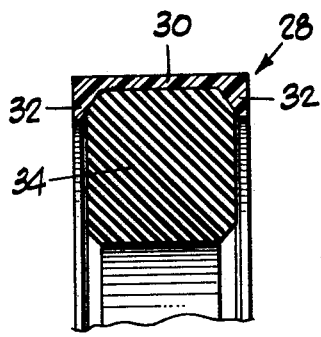
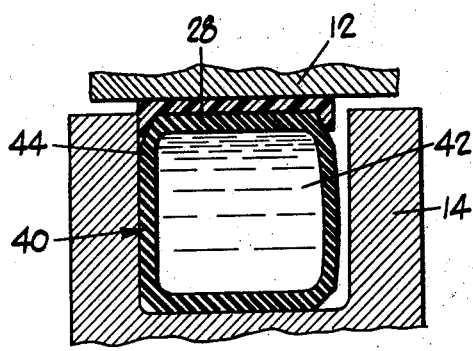
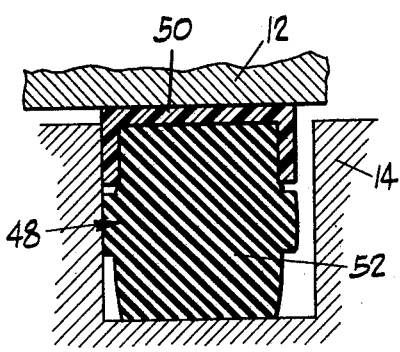
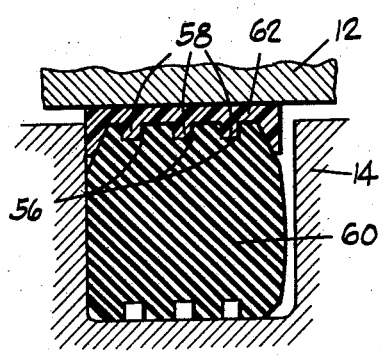
INVENTOR.
CHARLES W. GALLOWAY
BY
Edwin Coates
-ATTORNEY-

3,149,848
HYDRAULIC CAP AND PRESSURE RING SEAL
Charles W. Galloway, Canoga Park, Calif., assignor to Douglas Aircraft Company, Inc., Santa Monica, Calif.
Filed Nov. 14, 1960, Ser. No. 68,959
3 Claims. (Cl. 277—165)

This invention relates to fluid seals for precluding the leakage of hydraulic fluid which is used to effect the powered reciprocation of a piston within a mating cylinder.

The type of packing ring that has in the past been most universally employed is a rubber annulus of circular cross section, commonly referred to as O-rings, which is seated in an annular groove in the surface of one of the relatively reciprocating members and confronts the matching surface of the other member. A sealing effect is accomplished by making the cross section of the rubber ring greater in diameter or thickness than the depth of the groove to thus result in the compression of the O-ring when the parts are assembled and, being resilient, the O-ring constantly is attempting to restore itself to its relaxed configuration and will therefore rub and seal against the surface which confines it within the groove.

There are two primary disadvantages associated with the use of a simple rubber O-ring as a packing member. The first of these is that the degree of abrasion between the O-ring and the surface of the part across which it is rubbed is so great that the service life of the O-ring is relatively short. Even though the hydraulic fluid does lubricate the O-ring it is not effective to give it an appreciable life and, further, after the piston-cylinder unit have been at rest over a period of time, the O-ring tends to adhere itself to the surfaces, and, upon actuation, has to tear itself away from the moving surface and is thereby damaged. The second disadvantage of the O-ring arises from the action of the pressurized hydraulic fluid against the side of the O-ring. This action causes the extrusion of the O-ring out of its seating groove and into a ribbon in the very small clearance between the mating piston and cylinder surfaces.

Each of these difficulties has been individually, but only partially, remedied by more recent developments. As for example, in U.S. Patent No. Re. 24,440 of March 4, 1958, to W. Groen, the abrasion of the O-ring is substantially reduced by the interposition of a cap of polytetrafluoroethylene resin between the outer surface of the O-ring and the adjacent surface which is normally pressurally wiped by it. The second problem involving the extrusion of the O-ring has been solved to a degree by the use of "backup rings" of plastic as shown in U.S. Patent No. 2,749,193 issued June 5, 1956, to H. A. Traub.

It is a principal feature of the present invention to provide a seal which not only combines the advantages of these two prior patented advances but at the same time achieves an improvement in each of such advantages.

Even though the above two patents improve the life of the O-ring there are inherent shortcomings in each of them which are experienced when very high hydraulic pressures, in the order of 10,000 p.s.i., are used to move the piston within the cylinder. As to the backup washer of Patent No. 2,749,193 it has been found that at the very high pressure, even though the plastic ring has more resistance to extrusion than does the rubber O-ring, such pressure after repeated cycles will in fact extrude the backup into the space or clearance between the piston and cylinder.

From a review of the other Patent No. Re. 24,440, it will be seen that only the central thinned portion of the plastic cap ring is pressurized by the rubber expander O-ring and thus only a portion of the width of the cap ring exerts a sealing pressure. Perhaps this may adequately seal at low pressure, but at high pressures it would be more desirable to utilize the full width of the cap ring to obtain a more efficient seal. Also, at high pressures the pressure fluid will enter one side of groove in which the seal is seated and roll the rubber O-ring to the other side of that groove. When this occurs then quite apparently the rubber will no longer be in a position to exert the desired radial pressure on the thin central portion of the cap ring and even though, as taught in the patent the thin section is pressured outwardly by the hydraulic fluid, this same fluid will seep between the outer surfaces of the cap ring and the cylinder wall to balance or counteract that outward pressure and will leak.

As stated previously, neither of the referenced patents remedy both the main shortcomings of a simple rubber O-ring seal. That is, the O-ring in the Traub patent, while prevented from extruding, is subject to abrasion against the cylinder wall, and the rubber O-ring in the Groen assembly can be extruded out of the groove, past the cap ring, and between the onward surfaces of the piston and cylinder.

The advantages of the present seal are achieved by the use of a cap ring of plastic material having a channel-shaped cross section with substantially its entire base being of relative thin material so that such base, which seals against the moving surface confronting the groove, can be pressured into sealing contact. The two arms of the channel-shaped cap ring extend radially of the base and toward the groove bottom and serve to (1) act as antiextrusion rings for the confined rubber ring, hereinbelow described, and (2) serve to facilitate assembly and retention of the cap ring within the groove. Beneath the channel-shaped cap ring and the bottom of the groove is nested a rubber-like ring which, in its relaxed or uncompressed condition, has an outer (relative to the bottom of the groove) face exactly conforming to the concave face of the channel-shaped cap ring and which has a radial thickness greater than the space between the cap ring and the groove bottom. With this configuration, when assembled, the rubber pressure ring is placed in compression and since the full under surface of the cap ring matches and contacts the pressure ring, the full width of the cap ring is urged with uniform pressure against the opposing relatively moving surface of the piston cylinder unit.

An additional feature of the present invention is accomplished by proportioning the rubber pressure ring so that when it is compressed beneath the cap ring, the pressure ring expands laterally to occupy substantially the full width of the groove. By thus proportioning the rubber ring when pressure fluid enters one side of the groove there is but little, if any, side motion of that ring within the groove and the force of the fluid against one side of the ring immediately is transferred uniformly and radially against the cap seal as well as the other surfaces of the rubber ring. Thus, the higher is the pressure of the powering fluid, the greater is the sealing pressure exerted by the pressure ring on the cap ring. In this manner the sealing combination is good under both high and low pressure applications. It will be apparent also that as the fluid pressure is increased against one side of the rubber pressuring ring it presses the downwardly extending arm of the cap ring on the other side more tightly against the side of the groove so as to better prevent extrusion of the rubber ring.

In summary, the present cap ring and pressure ring seal combination provides a self compensating system which, as the hydraulic fluid pressure varies, so varies the sealing effect exerted and as pressure against the side of the rubber ring varies, so varies the effect of the anti-extrusion feature of the cap ring.

There are additional features and advantages of the present invention which will be obvious from an understanding of the presently preferred embodiments thereof below described and shown in the accompanying drawings in which:

FIG. 1 is a fragmentary side elevation view, in section, of a piston and cylinder unit in which one form of the present seal is installed.

FIG. 2 is an enlarged view of the cap and pressure ring of the seal employed in the assembly of FIG. 1, the pressure ring being in its relaxed or uncompressed condition.

FIGS. 3, 4 and 5 are fragmentary sectional views of modified forms of the cap and pressure ring seal combination.

In referring to the drawings, FIG. 1 shows a conventional, simple power unit 10 including a cylinder 12 within which is a relatively reciprocable piston 14 from which the piston rod 16 extends through an opening in the cylinder end wall 18. The power to this unit 10 is applied by the admission of a pressurized pneumatic or hydraulic fluid into chamber 20 defined by and between piston 14 and end wall 18. The seal of this invention has for its purpose the prevention of leakage of this pressurized fluid pass such mating cylindric surfaces at those respectively of the piston 14 and cylinder 12, and the opening in end wall 18 and piston rod 16.

The desired improved sealing is accomplished by providing the usual annular, generally rectangular cross sectional grooves 24 and 26 respectively in the peripheries of the piston 14 and the opening in the cylinder end wall 18. (For brevity the particular seal positioned within the grooves will be here described only with respect to the piston seal, it being apparent that the seal in the cylinder wall opening is identical excepting that the latter is reversed so as to press inwardly against the rod 16 whereas the piston seal acts radially outwardly.) Within the groove 24 at its radially outwardly opening extremity is positioned an annular "cap" ring 28 having a thin base portion 30 and at each end of base 30 is an arm 32 which extends radially inwardly toward the bottom of groove 24. The base 30 and arms 32 together give the cap ring 28 a general channel shaped configuration. The junctures of base 30 and arms 32 are filleted at an angle of approximately 45° for a purpose later mentioned. Of course, for the seal combination shown in FIG. 1 (and FIG. 2) wherein the surfaces of the concavity of the cap ring 28 are rectilinear in all cross sectional stations, the outer marginal-peripheral surfaces of the pressure ring 34 should be also matchingly rectilinear in all cross sectional stations.

One principal purpose of cap ring 28 is for it to constitute a substantially friction free sealing surface which is in rubbing contact with the adjacent or opposed surface of the cylinder 12. This lack of friction is obtained by the selection of material from which it is made, the preferred selection being that of a polymer of tetrafluoroethylene which is available and sold under the trade name "Teflon." The quality of this material which makes it more desirable is that it is, in effect, a solid lubricant and thus has a very low coefficient of friction. Additional desirable characteristics of Teflon are its inertness to oils and synthetic hydraulic fluids and its insensitiveness to changes in temperature.

In practice, the width of cap seal 28 is substantially equal to the width of groove 24, the clearance or difference in width as shown in the drawings being exaggerated. The radial thickness of the base 30 of cap ring 28 may be varied slightly in accordance with the diameter of the annular cap seal but preferably is in the range of .008 to .010 inch so that it is sufficiently flexible to enable it at all times to be maintained in contact with the cylinder wall without there being any buckles or wrinkles therein. The overall length of the downwardly extending arms 32 is approximately three (3) times as great as the thickness of base 30. By employing these dimensions and proportions, the annular cap ring can be stretched or distended, without rupture, over the piston when assembling the unit.

To withstand the bending forces on arms 32 of the cap ring 28 exerted when the power unit is pressurized, the junctures of arms 32 and base 30 are filleted at approximately 45° as shown in FIG. 2. The causation of these bending forces will be mentioned in the hereinafter described operation of the seal.

The cap ring 30 is forced into sealing contact with the wall cylinder 12 by means of an annular rubber O-ring 34, rectangular in cross section, confined in the groove 24 beneath the cap ring 30. The relaxed or undistorted radial thickness of this O-ring 34 is greater than the radial distance between the bottom of groove 24 and the inwardly facing surface of cap ring 28, and the width of O-ring 34 is only slightly less than the width of groove 24. Also, in its relaxed condition, the surface of the O-ring 34 which contacts the underside of cap ring 28 exactly conforms to such underside. That is, the outer surface of O-ring is flat and has its corners chamfered to match the base 30 and fillets between base 30 and arms 32 of the cap ring 28.

When the O-ring 34 is assembled, as shown in FIG. 1, it is placed under compression and, by reason of its resiliency, pressurally urges cap ring 28 into sealing contact with cylinder 12. When so compressed, the side walls of O-ring 34 bulge slightly so that it then approaches, in width, the width of groove 24. Since the under or concave face of cap seal 28 and the contacting surface of O-ring 34 are of matching configurations, the outer surface of cap seal 12 is uniformly pressurized, across its width, into sealing relation with cylinder 12.

When the high pressure power fluid is admitted to chamber 20 there is leakage, without substantial diminution of pressure, of the fluid up to right side, as viewed in FIG. 1, of the seal combination. The pressure of this fluid is transmitted into the rubber O-ring thence into cap seal 28 to increase its sealing force against cylinder 12. While, of course, the power fluid under the same pressure is also seeking a path and exerting pressure between the contacting opposed surfaces of the cap ring 28 and cylinder 12, the cap ring 28 always is under greater radial outward pressure, the differential being the force exerted by the resiliency of O-ring 34. Thus, under all pressures, whether they be high or low, an effective, leak proof seal is made.

The lateral force on the side face of O-ring 34 exerted by the power fluid also tends to extrude the other side face of that O-ring into the clearance between the piston 14 and cylinder 12 on the low pressure side of the seal, i.e. to the left of the seal as viewed in FIG. 1. However, this extrusion is prevented by the arm or flange 32 of cap seal 28 which closes off or blocks the clearance. Further, since as the compression force on O-ring 34 increases as a function of the pressure of the power fluid, this compression force more firmly urges the arm 32 against the side wall of groove 24 to make it better serve its "back up" or antiextrusion function at high pressures.

When the O-ring is placed under high side pressure, in its effort to "flow" the rubber tends to bend the arms and spread them away from each other. Without the fillets at these arms 32, repeated cycling of power fluid into chamber 20 will fatigue them to a degree at which they will fracture at their points of juncture with base 30 of cap ring 28. By filleting these juncture points, adequate strength is added which will enable the arms to withstand the fatigue forces.

It will additionally be evident from the configuration of the cap ring 28 that, since it embraces both the side and top walls of O-ring 34, it is in effect as though it were a solid block of Teflon and, therefore, the Teflon itself will not be extruded out of grooves 24 and in between the cylinder and piston even at high pressures. This effect has proven to be an appreciable improvement over previously used spiral type back up rings.

As heretofore mentioned, when the O-ring 34 is in its compressed condition beneath cap rings 28, it occupies substantially the full confines of groove 24. By so doing, when the pressure of the power fluid reaches the seal, there remains no appreciable room for lateral movement of the ring 34 within the groove. The O-ring 34 is thus rendered free of all scrubbing action against the walls of the groove 24. Being of rubber material, the O-ring 34 thereby serves as an immobile pressure transmitting media, functioning to transmit the pressure of the power fluid radially outwardly against the cap seal 28, radially inwardly and laterally against the walls of groove 24 to completely seal the piston 14 with respect to cylinder 12.

The seal 40 of FIG. 3 is quite similar to that shown in FIGS. 1 and 2, the distinctive feature of this variation residing the utilization of a body of non-compressible fluid 42 confined within annular tube 44 having external dimensions equal to those of rubber O-ring 34. As above pointed out, the purpose of the O-ring is to transmit pressure equally to all portions of cap ring 28. With the use of the confined liquid 42 this purpose is slightly better carried out than in the case where a solid rubber O-ring is used by virtue of that known property of a confined liquid to transmit equal unit pressures to all walls of its containing vessel. While a mass of rubber acts somewhat like a liquid in this respect, there are some slight variations in pressures among discrete points on the surfaces of the rubber. This seal member 40 thus offers the most ideal construction although it may not be as inexpensive as the solid rubber O-ring 34.

In FIG. 4 another form of seal construction 48 is shown in which the cap ring 50 cooperates with an expander O-ring 52 for the purpose and in the manner of the seal of FIG. 1. In this embodiment it will be seen that the points of juncture of the base and arms of channel-shaped cap seal 50 are not filleted and the corners of O-ring 52 are squared to match the channel shape. While the arms of this cap seal 50 are more susceptible to failure under repeated bending loads, in low pressure systems, where such loads are not great, this seal configuration will adequately perform its function over many cycles of piston-cylinder operation.

In FIG. 5 there is shown a still further modification of the seal of FIG. 1. When the seal of FIG. 1 is placed on compression by the force of pressure fluid applied to chamber 20, there is always some, though slight, side movement of the O-ring 34 with respect to cap ring 28. By the provision of interlocking grooves 56 and tongues 58 respectively in the rubber O-ring 60 and cap ring 62, even this slight side movement can be reduced or eliminated to further prolong the seal life. It will be apparent that this means of interlocking the cap seal and O-ring can also be used in those seal embodiments shown in FIGS. 3 and 4.

In each embodiment of the O-ring utilized to urge the cap ring against the cylinder wall it is shown that the surface of the O-ring contacting the bottom of the groove in the piston is configured the same as is its opposing surface which contacts the cap ring. This is done so that the same O-ring can be used in either of two installations. That is, it can be used where the groove in the piston opens radially outwardly, as in FIG. 1, or when the groove opens radially inwardly and is in the cylinder end wall as shown in FIG. 1, it being understood that the diameter of the end wall opening must be properly proportioned with respect to the inside diameter of the O-ring. While ideally the O-ring should fully occupy the volume of the groove and does not, as depicted in the drawings, because of the presence of chamfers and recesses, it is quite obvious that to achieve the ideal construction either the bottom of the O-ring or the bottom of the groove could be modified so as to make them identical in cross section with the surface which they contact.

Although there are shown and described herein only the presently preferred embodiments of the invention, it is to be understood that it is susceptible to changes within the scope of the following claims.

I claim:

1. Sealing means for precluding the leakage of fluid pass two relatively reciprocable members having mating cylindric surfaces, one of which surfaces has an annular groove substantially rectangular in cross section confronting the other surface and in which groove the sealing means are seated, said sealing means comprising:

a continuous, annular, flexible outer sealing ring having a low coefficient of friction, said outer sealing ring being concave on its inner face and having a flexibly thin central base, the surfaces of the concavity of said outer ring including a broad base planar surface and being rectilinear in all cross sectional stations, and said outer ring being substantially as wide as, and receivable in, the aforementioned groove with its outer face adapted to slidably engage the surface of the other one of the relatively reciprocable members; and an annular, resilient, deformable pressure ring nested below said outer ring for tightly urging the latter into sealing engagement with the surface which it contacts, the outer marginal-peripheral surfaces of said pressure ring being rectilinear in all cross sectional stations to match in its relaxed state the confronting surfaces of the concavity in said outer ring and be in interfitting contact therewith at all times, the resiliency of said pressure ring under compression exerting a substantially uniform pressure against all portions of the planar surface of said outer ring, the total radial thickness of said outer ring and pressure ring, when relaxed, being greater than the depth of the groove so that with said sealing means mounted in the groove, said pressure ring pressures said outer ring, the two rings aforesaid then having their greatest width substantially equal to the groove width whereby when the reciprocating members are assembled with said seal in the groove, said pressure ring will be deformed so that at all times it pressures said outer ring and the full width of said outer ring is utilized to provide an effective seal in which said pressure ring is in interfitting contact with said rectilinearly congruent channel of said outer ring to prevent extrusion of said pressure ring into a ribbon between said mating cylindric surfaces from low to very high fluid pressures.

2. A seal for precluding the leakage of fluid pass two relatively reciprocating members having mating cylindric surfaces, one of which surfaces has an annular groove of substantially rectangular cross section confronting the outer surface and in which groove the seal is seated, said seal comprising:

a continuous, annular, cap ring of flexible material having with respect to all materials a low coefficient of friction, said cap ring having a broad flexibly thin base and radially projecting arms extending from respective sides of the base at its edges to form a channel which is rectilinear in all cross sectional stations, the channel being filleted at the inner junctures of the base and arms, said cap ring being substantially as wide as and receivable in the groove with its projecting arms extending toward the bottom of the groove and the outer face of said cap ring being slidably engageable with the surface of the relatively reciprocating members; and a resilient, deformable, rubber-like annular pressure ring nested below and within the channel of said cap ring for urging said cap ring into sealing contact with the surface which it contacts, said pressure ring being rectangular in cross section and having its corners on that side thereof which confronts said cap ring beveled so that said pressure ring in its relaxed state closely conforms congruently and is in interfitting contact at all times to the filleted channel and, when compressed, the resiliency of said pressure ring exerts a substantially uniform pressure against all portions of the channel surfaces of said cap ring, the combined radial thickness of said cap ring and pressure ring, when undistorted, being greater than the depth of the groove whereby when the reciprocating members are assembled with said seal in the groove, said pressure ring will be deformed so that at all times it pressures said cap ring, said pressure ring when so deformed having its greatest width substantially equal to the groove width and the full width of said cap ring is utilized to provide an effective seal in which said pressure ring is in interfitting contact with said rectilinearly congruent channel of said cap ring to prevent extrusion of said pressure ring into a ribbon between said mating cylindrical surfaces from low to very high fluid pressures.

3. A seal for precluding the leakage of fluid pass two relatively reciprocating members having mating cylindric surfaces, one of which surfaces has an annular groove of substantially rectangular cross section confronting the other surface and in which groove the seal is seated, said seal comprising:

a continuous annular cap ring of material having, on metal, a low coefficient of friction, said cap ring having a broad base of thickness in the range of .008 and .010 inch and radially projecting arms having a length equal to approximately three times the thickness of the base extending from respective sides of the base at its edges to form a channel which is rectilinear in all cross sectional stations, the channel being filleted at the inner junctures of the base and arms, and said cap ring being substantially as wide as and receivable in the groove with its projecting arms extending toward the bottom of the groove and the outer face of said cap ring being slidably engageable with the surface of the other of the reciprocating members; and a resilient, deformable, rubber-like annular pressure ring nested beneath and within the channel of said cap ring for urging said cap ring into sealing contact with the surface which it contacts, said pressure ring in its relaxed state being square in cross section having a lateral dimension substantially equal to that of the groove and having its corners beveled to conform congruently and be in interfitting contact at all times to the filleted channel to prevent any relative movement therebetween, and when compressed, said pressure ring expands laterally to occupy substantially the full width of the groove and the resiliency of said pressure ring exerts a substantially uniform pressure to all portions of the channel surfaces of said cap ring, the combined radial thickness of said cap ring and pressure ring, when relaxed, being greater than the depth of said groove whereby when the reciprocating members are assembled with said seal in said groove, said pressure ring will be deformed so that at all times it pressures said cap ring and the full width of said cap ring is utilized to provide an effective seal in which said pressure ring is in interfitting contact with said rectilinearly congruent channel of said cap ring to prevent extrusion of said pressure ring into a ribbon between said mating cylindric surfaces from low to very high fluid pressures.

References Cited in the file of this patent
UNITED STATES PATENTS
2,968,501    Tisch ------------------ Jan. 17, 1961